United States Patent [19]

Arai

[11] Patent Number: 5,286,421

[45] Date of Patent: Feb. 15, 1994

[54] OPTICAL ELEMENT, AND METHOD AND APPARATUS FOR FORMING THE SAME

[75] Inventor: Takashi Arai, Tokyo, Japan

[73] Assignee: Canon Kabushiki Kaisha, Tokyo, Japan

[21] Appl. No.: 894,852

[22] Filed: Jun. 5, 1992

[30] Foreign Application Priority Data

Jun. 7, 1991 [JP] Japan .................. 3-136279

[51] Int. Cl.⁵ ............................. B29D 11/00
[52] U.S. Cl. ..................... 264/1.7; 264/1.4; 264/259; 264/260; 264/313
[58] Field of Search ............ 264/1.4, 1.7, 259, 260, 264/313

[56] References Cited

U.S. PATENT DOCUMENTS

| | | | |
|---|---|---|---|
| 4,116,753 | 9/1978 | Tojyo et al. | 156/629 |
| 4,235,654 | 11/1980 | Dohi et al. | 156/99 |
| 4,623,496 | 11/1986 | Verhoeven et al. | 264/1.7 |
| 4,738,516 | 4/1988 | Verhoeven et al. | 350/432 |
| 4,985,186 | 1/1991 | Nose et al. | 264/1.7 |
| 5,062,786 | 11/1991 | Arai | 425/174 |

Primary Examiner—Leo B. Tentoni
Attorney, Agent, or Firm—Fitzpatrick, Cella, Harper & Scinto

[57] ABSTRACT

In an optical element, and a method and apparatus for forming the same, peeling does not occur while a resin layer is cured, and the completed optical element can be easily released after the resin layer has been completely cured. The optical-element forming apparatus includes a forming surface for transferring a predetermined surface shape onto a surface of the resin layer, and includes a mold member having a high molecular weight material satisfying physical values of a hardness: >D50 and/or >R70, a modulus of elasticity: 5000–35000 kgf/cm², a coefficient of friction: <0.2, a coefficient of water absorption: <0.3%, and a light resistance: invariable or slightly variable.

9 Claims, 3 Drawing Sheets

OPTICAL ELEMENT, AND METHOD AND APPARATUS FOR FORMING THE SAME

BACKGROUND OF THE INVENTION

1. Field of the Invention

This invention relates to an optical element obtained by integrally forming a resin layer on a surface of a glass member, and a method and apparatus for forming the same.

2. Description of the Prior Art

There are known methods wherein a lens having an aspherical shape which is difficult to obtain by processing a glass material is obtained by performing forming-processing of a thin film made of a resin material on a surface of a glass member. Lenses formed by such methods are in general termed replica lenses.

In forming a replica lens, as shown in FIG. 4, a glass member 50 processed in the shape of a spherical surface having a curvature close to the shape of the aspherical surface is mounted on a mold member 52 having a forming surface 52a in the shape of a desired aspherical surface. A replica lens 55 having the shape of the desired aspherical surface is formed by filling a liquid resin in a space 54 defined by the surface of the glass member 50 and the forming surface 52a of the mold member 52 and, thereafter, curing the resin.

Preceding technical references are, for example, U.S. Pat. Nos. 4,116,753, 4,623,496 and 4,738,516.

There is, for example, a method disclosed in U.S. Pat. No. 4,235,654 providing an optical filter using a replica technique.

When a resin material is subjected to forming processing in a mold as described above, the resin material in general contracts while being cured. That is, the resin material filling the space 54 between the forming surface 52a of the mold member 52 and the surface of the glass member 50 before being cured contracts after being cured, whereby the volume of the resin material becomes smaller than the space 54 defined between the forming surface 52a and the surface of the glass member 50.

The following phenomena occur due to the reduction of the volume of the resin material:

(a) The glass member 50 itself is bent by being drawn by the contracted resin material.

(b) Peeling occurs between the surface of the glass member 50 and the resin material.

(c) Peeling occurs between the forming surface 52a of the mold member 52 and the resin material.

If the glass material 50 itself is bent as in case (a), the shape of the formed aspherical surface merely deviates from the desired shape slightly. If peeling occurs between the glass member 50 and the resin material as in case (b), the peeling may cause a fatal defect. When peeling occurs between the forming surface 52a and the resin material as in case (c), the entire surface of the resin material does not uniformly peel, since it partially peels. Hence, a difference in the degree of contraction is produced between the peeled portion and the portion in close contact with the forming surface 52a, whereby the surface of the resin is formed in a shape having discontinuous curvatures making the line between the peeled portion and the unpeeled portion a border.

If the binding force between forming surface 52a and the resin layer is increased more than necessary in order to prevent peeling between the forming surface 52a and the resin layer, the releasing force is increased when the formed replica lens 55 is released from the mold member 52, whereby the replica lens 55 will be damaged or the resin layer will be deformed when releasing the replica lens 55.

SUMMARY OF THE INVENTION

The present invention has been made with consideration of the above-described problems.

It is an object of the present invention to provide an optical element, and a method and apparatus for forming the element in which peeling does not occur between a glass member and a resin layer and between a mold member and a resin layer while the resin layer is cured. It is a further object that the optical element can be released without damaging the completed optical element or deforming the resin layer after the resin layer has been completely cured.

This object is accomplished, according to one aspect of the present invention, by an optical-element forming apparatus for forming an optical element comprising a glass material and a resin material made as one body by forming a resin layer having a predetermined surface shape on a surface of a glass member by forming-processing. The apparatus comprises a mold member having a forming surface for transferring the predetermined surface shape onto a surface of the resin layer, and comprises a high molecular weight material satisfying the following physical values:

Hardness: $>D50$ and/or $>R70$
Modulus of elasticity: 5000–35000 kgf/cm$^2$
Coefficient of friction: $<0.2$
Coefficient of water absorption: $<0.3\%$
Light resistance: invariable or substantially invariable.

According to another aspect, the present invention relates to an optical-element forming method for forming an optical element comprising a glass material and a resin material made as one body by forming a resin layer having a predetermined surface shape on a surface of a glass member by one-sequence forming-processing. The method comprises the step of using a mold member for transferring the predetermined surface shape onto the resin layer, the mold member comprising a high molecular weight material satisfying the following physical values:

Hardness: $>D50$ and/or $>R70$
Modulus of elasticity: 5000–35000 kgf/cm$^2$
Coefficient of friction: $<0.2$
Coefficient of water absorption: $<0.3\%$
Light resistance: invariable or substantially invariable.

According to another aspect, the present invention relates to an optical-element forming method for forming an optical element comprising a resin layer having a final desired surface shape obtained by combining a plurality of resin layers made integral with a glass member by sequentially laminating the plurality of resin layers each having a predetermined surface shape on a surface of the glass member by a plurality of sequences of forming-processing. The method comprises the step of using a mold member for transferring the predetermined surface shape onto the resin layer in at least one of the plurality of sequences of forming-processing, the mold member comprising a high molecular weight material satisfying the following physical values:

Hardness: $>D50$ and/or $>R70$
Modulus of elasticity: 5000–35000 kgf/cm$^2$
Coefficient of friction: $<0.2$ Coefficient of water absorption: <0.3%

Light resistance: invariable or substantially invariable.

In the optical element, and the method and apparatus for forming the element of the present invention, by using a high molecular weight material for the mold member, the mold member is deformed in response to contraction of the resin material, thereby preventing peeling between the resin layer and the glass member, and peeling between the resin layer and the mold member.

Since the mold member is deformed so as to prevent peeling between the resin layer and the glass material, and peeling of the mold member, it is possible to select the properties of the material of the mold member so that the binding force between the resin material and the mold member does not become too large. Hence, it is possible to prevent, for example, damage to the optical element while it is being released.

DESCRIPTION OF THE PREFERRED EMBODIMENTS

A preferred embodiment of the present invention will now be explained in detail with reference to the attached drawings.

Figure 1:
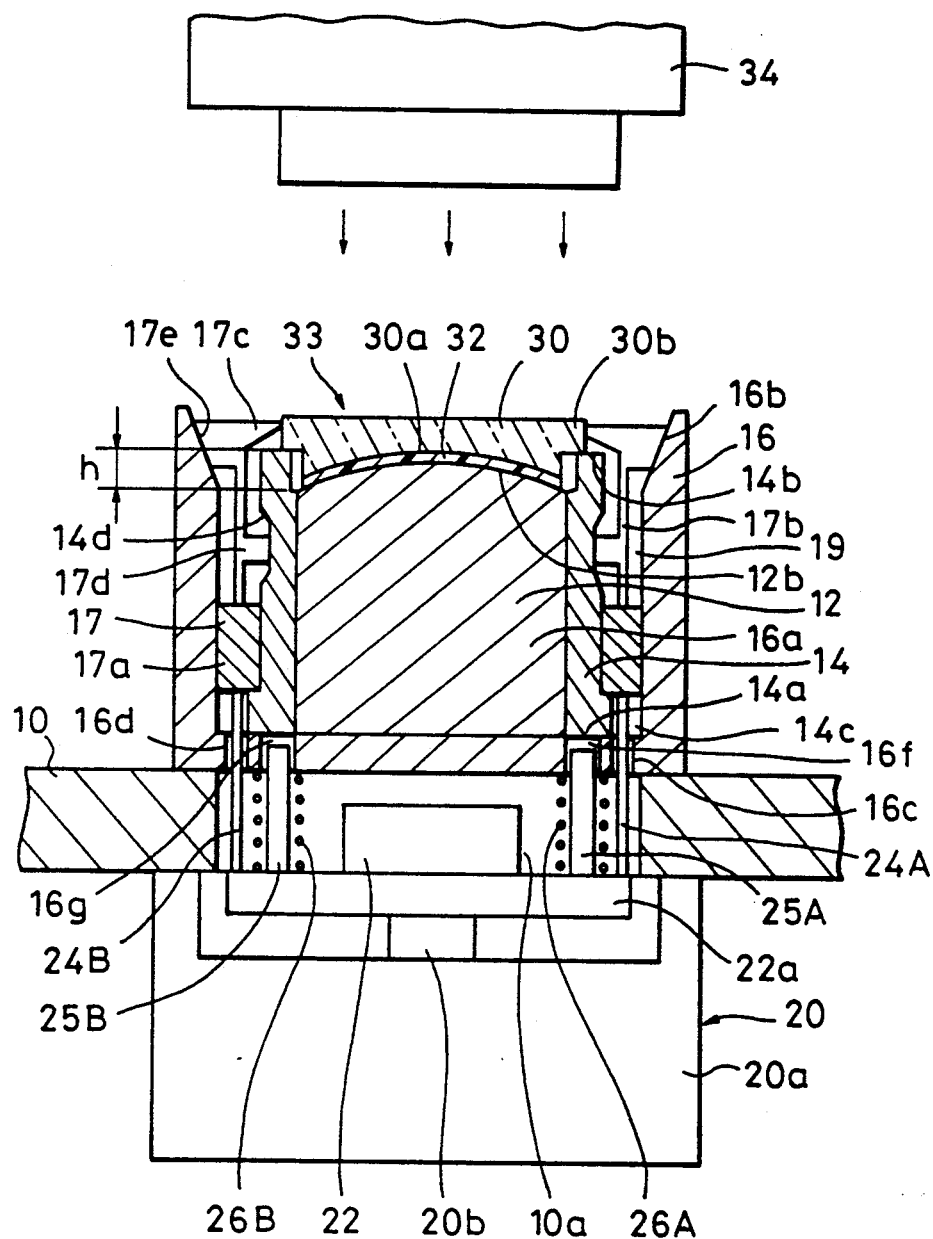
FIG. 1 is a diagram showing the structure of a forming apparatus according to an embodiment of the present invention.

FIG. 1 is a diagram showing the schematic structure of an optical-element forming apparatus of the embodiment.

Before explaining the configuration of the forming apparatus, an explanation will be provided of schematic contents of a method of forming an optical element by the forming apparatus. In this forming method, a shape which is difficult to process for a glass material is formed on a surface of a glass member. That is, a resin layer having a desired complicated surface shape made of a resin material is formed on a surface of a glass member and, thereafter processed to a shape which is relatively easy to process. For example, a resin film having an aspherical shape is formed on a surface of a glass member and processed to an aspherical shape, whereby an aspherical lens comprising a glass material and a resin material is formed. That is, in order to provide a single lens in which aberration is corrected, the surface shape of the lens must be aspherical. However, it is not easy to process a glass material to an aspherical shape. On the other hand, a lens using a resin which can be easily formed in an aspherical shape cannot provide enough lens power. In the present forming method, only the advantages of a glass material and a resin material are utilized by combining the two materials. A lens produced by such a method is termed a replica lens.

More specifically, as shown in FIG. 1, a resin layer 32 comprising a thin film of an active-energy-ray-curing resin is formed on a connecting surface 30a which is one surface of a glass member 30 processed to an aspherical shape. The glass member 30 includes a flange-like shoulder 30b at its circumferential portion. The shoulder 30b is supported on a supporting member 14 in a state of contacting an upper end surface 14b of the supporting member 14. The upper end surface 14b protrudes from an edge portion of a forming surface 12b of a mold member 12 for forming the surface shape of the resin material by a height h. The resin layer 32 is controlled so as to have a predetermined thickness even at a portion where the resin layer 32 has the least thickness (The resin layer 32 has different thicknesses since the forming surface 12b is aspherical). By irradiating active-energy rays onto a liquid resin material filled in the space defined by the forming surface 12b of the mold member 12 and the connecting surface 30a, the resin material is cured to provide a replica lens 33.

Next, an explanation will be provided of the configuration of the apparatus for forming a replica lens with reference to FIG. 1. A substrate 10 for holding the mold member 12 for forming the resin layer 32, the supporting member for supporting the glass member 30, an upper surface of the glass member 30b, and the like is provided so as to extend in the horizontal direction. The mold member 12, the supporting member 14, a mold frame 16 and a chucking member 17 are supported on the upper surface of the substrate 10. An air cylinder 20 for relatively moving the supporting member 14 and the chucking member 17 relative to the mold member 12 is disposed below the lower surface of the substrate 10.

More specifically, the mold frame 16 having a columnar recess upwardly and perpendicularly opening in a central portion is fixed to the upper surface of the substrate 10. The supporting member 14 which is substantially cylindrical is inserted inside the columnar recess 16a. A flange member 14c whose outer circumferential surface is slidably fitted to the inner circumferential surface of the columnar recess 16a is provided at a lower end of the supporting member 14.

The mold member 12 whose outer diameter is slightly smaller than the inner diameter of the supporting member 14 is inserted inside the supporting member 14. The lower end surface of the mold member 12 is fixed to the upper surface of the base of the columnar recess 16a. Accordingly, the supporting member 14 is slidable relative to the mold member 12 and the mold frame 16 in directions (the up-and-down directions in FIG. 1) along the central axis of the mold member 12 in a state in which the inner circumferential surface of the supporting member 14 and the outer circumferential surface of flange member 14c are guided by the outer circumferential surface of the mold member 12 and the inner circumferential surface of the mold frame 16, respectively.

A cylindrical space 19 is formed between the outer circumferential surface of the supporting member 14 and the inner circumferential surface of the mold frame 16. The chucking member 17 which is substantially cylindrical is mounted in the space 19 in a state in which the inner circumferential surface and the outer circumferential surface of a fitting member 17a provided at a lower portion of the chucking member 17 are fitted to the outer circumferential surface of the supporting member 14 and the inner circumferential surface of the mold frame 16, respectively, and the lower end surface of the fitting member 17a contacts the upper surface of the flange member 14c of the supporting member 14. The chucking member 17 is slidable in directions (the up-and-down directions in FIG. 1) along the central axis of the mold member 12 in a state in which the fitting member 17a is guided by the outer circumferential surface of the supporting member 14 and the inner circumferential surface of the mold frame 16.

The upper portion of the chucking member 17 has a shape obtained by equally dividing a cylinder into four portions each of which forms an arm member 17b. The arm member 17b can be inwardly and outwardly bent due to the elasticity of a material forming the chucking member 17, since the arm member 17b is thinner than the fitting member 17a. A pawl 17c for chucking and positioning the outer circumferential surface of the glass member 30 (to be described later) is provided at a front end portion of the arm member 17b.

A projection 17d is formed at an intermediate portion of the arm member 17b, and a projection 17e is also formed at a front end portion of the arm member 17b. The projection 17d contacts a cam surface 14d formed on the outer wall of the supporting member 14, and the projection 17e contacts a slope 16b formed at an upper end portion of the mold frame 16.

Accordingly, by sliding the chucking member 17 in the up-and-down direction relative to the supporting member 14 and the mold frame 16, the four arm members 17b move along the cam surface 14d and the slope 16b to perform opening and closing operations of the pawls 17c. That is, by the sliding movement of the chucking member 17 in the up-and-down direction, chucking of the glass member 30 and release of the chucking are performed.

The air cylinder 20 for moving the supporting member 14 relative to the mold member 12 in the up-and-down directions, and moving the chucking member 17 relative to the supporting member 14 and the mold frame 16 in the up-and-down directions is fixed on the lower-side surface of the substrate 10. The air cylinder 20 includes a cylinder rod 20b moving relative to a main body 20a of the air cylinder at an upper portion thereof. A cylindrical connecting member 22 for connecting the supporting member 14 and the chucking member 17 is mounted on the upper surface of the cylinder rod 20b.

A flange member 22a is formed at an outer circumferential portion of the connecting member 22. Connecting rods 24A, 24B and 24C (only rod 24C is not shown) are vertically fixed to three points near the outer circumference on the upper surface of the flange member 22a. Upper end portions of the connecting rods 24A, 24B and 24C enter the cylindrical space 19 via an open hole 10a provided in the substrate 10, open holes 16c, 16d and 16e (only hole 16e is not shown) provided at three points on the base of the mold frame 16, and open holes provided in the flange member 14c, and are connected to the fitting member 17a provided at the lower side of the chucking member 17. Pushing-up rods 25A, 25B and 25C (only rod 25C is not shown) are vertically fixed on three points on a circumference inner than the portions where the connecting rods 24A, 24B and 24C of the flange member 22a are fixed. The upper end portions of the pushing-up rods 25A, 25B and 25C enter the columnar recess 16A via open holes 16f, 16g and 16h (only hole 16h is not shown) provided at three points on the base of the mold frame 16, and can contact the lower end surface 14a of the supporting member 14.

Compression springs 26A, 26B and 26C (only spring 26C is not shown) are disposed between the lower surface of the mold frame 16 and the upper surface of the flange member 22a of the connecting member 22 in a state of being loosely fitted to the outer circumferential surfaces of the pushing-up rods 25A, 25B and 25C, whereby the connecting member 22 is driven in a direction of being pushed down relative to the lower surface of the mold frame 16.

Accordingly, in a non-operating state of the air cylinder 20, the cylinder rod 20b and the connecting member 22 are downwardly pushed by their own weight and the driving force of the compression springs 26A, 26B and 26C. The supporting member 14 is situated below the mold member 12, and the chucking member 17 is situated below the supporting member 14 and the mold frame 16. In this state, as shown in FIG. 1, the upper end surfaces of the pushing-up rods 25A, 25B and 25C are separated from the lower end surface 14a of the supporting member 14, the four pawls 17c of the chucking member 17 are closed, and outer circumferential portions of the glass member 30 are chucked by the four pawls 17c.

In this state, the glass member 30 is held by the chucking member 17 so that the optical axis of the glass member 30 exactly coincides with the center of the forming surface 12b of the mold member 12.

Figure 2:
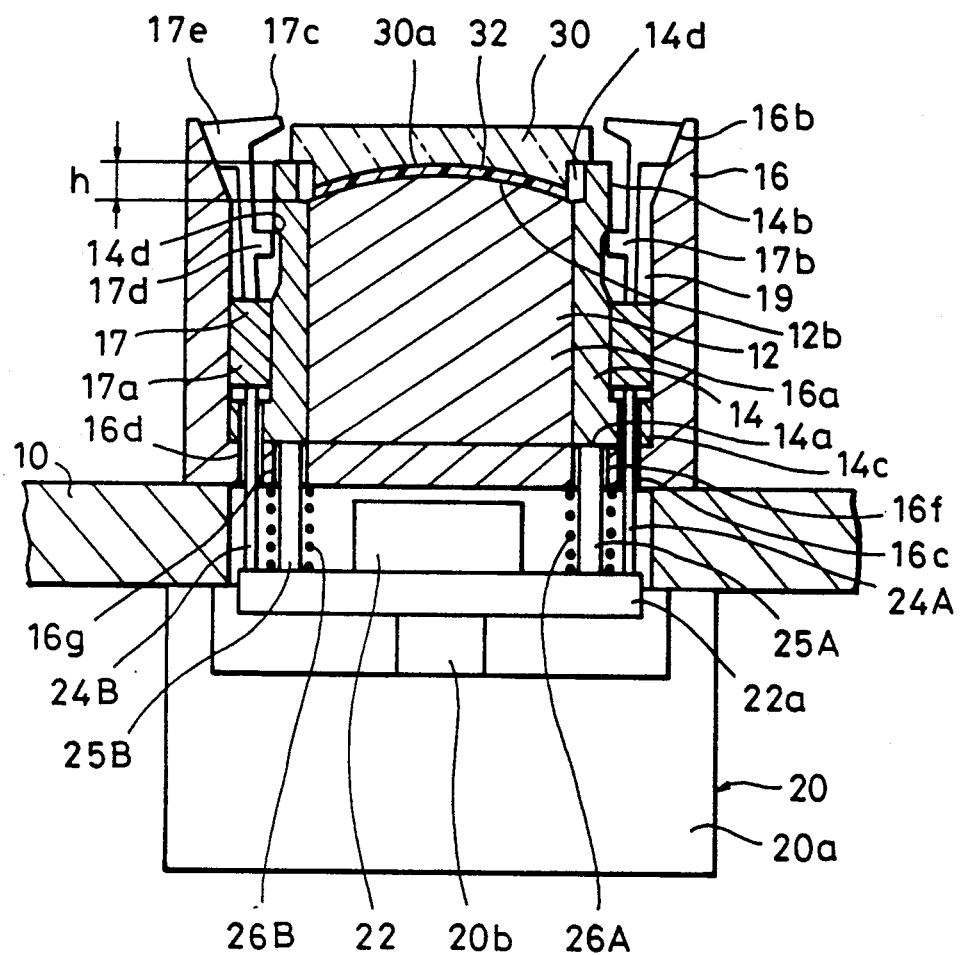
FIG. 2 is a diagram showing a state of releasing a chucked state of a glass member.

The air cylinder 20 is arranged to perform two-staged operations. If the connecting member 22 is upwardly moved by operating the air cylinder 20 in one stage, the chucking member 17 is upwardly pushed via the connecting rods 24A, 24B and 24C. The four pawls 17c of the chucking member 17 thereby assume an opened state, as shown in FIG. 2, and the chucked state of the glass material 30 is released. In this state, the upper end surfaces of the pushing-up rods 25A, 25B and 25C do not yet contact the lower end surface of the supporting member 14, and the supporting member 14 is situated below the mold member 12.

If the air cylinder 20 is further operated in another step from this state, the upper end surfaces of the pushing-up rods 25A, 25B and 25C contact the lower end surface of the supporting member 14 to upwardly push the supporting member 14. Hence, the completed replica lens 33 is released from the mold member 12.

The forming surface 12b of the mold member 12 has been processed in an aspherical shape required as the completed shape of the replica lens 33. Hence, by curing the resin material filled in the space defined by the connecting surface 30a of the glass member 30 and the forming surface 12b in a state in which the glass member 30 is mounted on the upper end surface 14b of the supporting member 14, the resin layer 32 to which the aspherical shape of the forming surface 12b is transferred can be formed on the surface of the glass member 30.

As can be understood from FIG. 1, the amount h of protrusion of the supporting member 14 defines the thickness of the resin layer 32 formed on the glass member 30. Although the value h of protrusion differs in accordance with the degree of asphericity (the difference in thickness between the thickest portion and the thinnest portion of the resin layer 32) of the forming surface 12b, the value h is set so that the thickness of the resin layer 32 is not thinner than a predetermined thickness at a position where the resin layer 32 has the minimum thickness. Although a detailed explanation will be provided later, the mold member 12 is produced by processing a high molecular material so as not to produce peeling between the connecting surface 30a of the glass member 30 and the resin layer 32, and between the resin layer 32 and the forming surface 12b by deforming in response to contraction of the resin layer 32 while the resin layer 32 is cured.

A clearance 14d for receiving an excess amount of the resin material is formed at an upper end portion of the supporting member 14 to prevent adhesion of the excess amount of the resin material to the supporting member 14, and formation of flash by the excess amount of the resin material overflowing from the contact portion between the glass member 30 and the upper end surface 14b of the supporting member 14.

An irradiating device 34 for irradiating active-energy rays is disposed above the glass member 30. The resin layer 32 can be cured by irradiating the active-energy rays from the irradiating device 34 onto the resin layer 32.

Next, an explanation will be provided of the procedure of forming a replica lens in the forming apparatus having the above-described configuration.

First, as shown in FIG. 2, the chucking state of the chucking member 17 is released by operating the air cylinder 20 in one stage.

In this state, the resin material is supplied on the forming surface 12b of the mold member 12. The amount of supply of the resin material at that time is set to an amount slightly greater than an amount to fill the space defined by the connecting surface 30a of the glass member 30 and the forming surface 12b of the mold member 12. In the present embodiment, a UV-curing resin is used as the active-energy-ray-curing resin.

Subsequently, the glass member 30 is mounted on the supporting member 14. In the process of mounting the glass member 30, the resin material is spread over the entire forming surface 12b by the connecting surface 30a of the glass member 30. At that time, if air bubbles are mixed in the resin material, the formed lens cannot be shipped as a product even though the amount of the air bubbles is so small that the air bubbles do not influence the optical properties of the lens. Accordingly, the process of mounting the glass member 30 on the supporting member 14 must be very carefully performed so that air bubbles are not mixed in the resin material.

Subsequently, as shown in FIG. 2, the operation of the air cylinder 20 is released in the state of mounting the glass member 30 on the supporting member 14, and the chucking member 17 is brought in a chucking state. The glass member 30 is thereby positioned relative to the mold member 12 so that the center of the optical axis of the glass member 30 coincides with the center of the forming surface 12b.

Subsequently, the irradiating device 34 irradiates ultraviolet rays, serving as active-energy rays, onto the resin material from above the glass member 30. The resin material is thereby cured, and the resin layer to whose surface the aspherical shape of the forming surface 12b has been transferred is formed on the connecting surface 30a of the glass member 30. At that time, the resin material contracts its volume while being cured. As described above, since the mold member 12 is made of a high molecular weight material, the forming surface 12b is deformed in response to the contraction of the resin material to prevent peeling between the connecting surface 30a of the glass member 30 and the resin layer 32, and between the resin layer 32 and the forming surface 12b. The deformation of the forming surface 12b indicates that the surface shape of the formed resin layer 32 deviates from the desired shape. However, the forming error of the resin layer 32 due to the deformation is very small, and therefore does not cause a great decrease in the optical properties. Moreover, if necessary, it is possible to correct the amount of the deformation by the shape of the forming surface. Peeling of the resin layer 32 from the connecting surface 30a, and peeling of the resin layer 32 from the forming surface 12b will cause greater problems.

After curing of the resin layer 32 has been completed, the air cylinder 20 is operated again. At that time, if the air cylinder 20 is operated in one stage as shown in FIG. 2, the chucked state of the glass material 30 by the chucking member 17 is released. If the air cylinder 20 is further operated in another stage, the supporting member 14 is pushed up by the pushing-up rods 25A, 25B and 25C, whereby the replica lens 33 is released from the mold member 12, and thus the replica lens 33 is completed.

If the binding force between the forming surface 12b of the mold member 12 and the resin layer 32 is too large while the replica lens 33 is released, the force applied for the releasing operation is increased, whereby the completed replica lens 33 may be damaged, or the resin layer 32 may be deformed. If the binding force between the forming surface 12b and the resin layer 32 is too small, peeling will be produced between the forming surface 12b and the resin layer 32 while the resin material is cured, causing problems. Hence, the high molecular material used for the mold member 12 must be selected under strict conditions. Conditions for selecting the high molecular material will be described later.

In the above-described explanation of forming processing, the procedure for forming the resin layer 32 on the surface of the glass member 30 by one-sequence forming-processing has been explained. However, for example, if the degree of asphericity (the difference in thickness between the thickest portion and the thinnest portion of the resin layer) of the forming surface 12b is too large, the desired aspherical shape cannot be in some cases exactly formed by one-sequence forming-processing, since the amount of contraction differs between a portion where the resin layer 32 is thick and a portion where the resin layer 32 is thin. In such a case, after first performing forming processing using a mold member having a forming surface processed to a desired aspherical shape (or a shape close to the desired aspherical shape), final forming processing is performed using a mold member having a forming surface processed to the desired aspherical shape.

By thus performing forming-processing twice, the second resin layer formed in the second forming-processing sequence has a substantially uniform thickness since the surface of the first resin layer has been formed to a shape close to the desired aspherical shape in the first forming-processing sequence. Hence, deviation in the surface shape due to a partial difference in the thickness of the resin layer is mitigated, and it is possible to form the resin layer 32 having a shape very close to the desired aspherical shape.

At that time, for performing forming processing of the two resin layers, the above-described one-sequence forming-processing may be repeated twice. However, since it is necessary to control the thickness of the first resin layer and the thickness of the second resin layer, two mold members 12 having different amounts h of protrusion corresponding to the first and second resin layers may be alternately used, or the position of the mold member 12 in the direction of height may be slightly moved.

Next, an explanation will be provided of the selection criteria of the material for the mold member used for forming the replica lens.

As described above, the mold member 12 must be formed by a material which can prevent peeling between the resin layer 32 and the connecting surface 30a of the glass member 30 and peeling between the resin layer 32 and the forming surface 12b by following contraction of the resin layer 32 while it is cured, and which does not have too large a releasing force while the replica lens 33 is released. Accordingly, requirements for a high molecular weight material to be used for the mold member 12 are as follows:

(1) Hardness

A certain degree of hardness is required in order to provide excellent mirror finishing capability of the forming surface 12b, and prevent flaws during forming processing (particularly when peeling occurs).

(2) Modulus of Elasticity

In order to prevent deformation of the glass member 30 caused by being drawn by the resin material contracting while it is cured, and peeling of the resin layer 32 from the mold member 12, the mold member 12 must be deformed to absorb the contraction of the resin material. Accordingly, a certain degree of elasticity is required.

(3) Coefficient of Friction

In order to reduce the releasing force after forming-processing, it is necessary to prevent the mold member 12 from adhering to the resin layer 32 more than necessary. Accordingly, it is preferred that the forming surface 12b of the mold member 12 has weak wettability. In general, wettability is reduced if the coefficient of friction is reduced. Accordingly, a material having a small coefficient of friction must be used as the mold member 12.

(4) Coefficient of Water Absorption

If the mold member 12 absorbs water or moisture, and absorbed water oozes to the forming surface 12b of the mold member 12, the resin material does not adhere to the mold member 12, and peeling between the mold member 12 and the resin layer 32 occurs before the mold member 12 is deformed. Accordingly, a small coefficient of water absorption is preferred.

(5) Light Resistance

If light is irradiated as the active-energy rays, the mold member 12 may be deteriorated by the irradiating light. For example, many high molecular weight materials deteriorate by being irradiated with ultraviolet rays because molecular chains are cut. Accordingly, it is necessary to select a material which does not deteriorate for the mold member 12 in accordance with the kind of light which serves as the active-energy rays.

After selecting various kinds of materials according to the above-described selection criteria and performing researches and experiments for the selected materials, we found that only materials which have specific physical values for the above-described respective items are extremely suitable for the mold member 12. Experimental results in examples in which some materials suitable for the mold member 12 were used will now be shown.

In these experiments, a UV-curing resin (an urethane-acrylate-type resin) commonly used as an active-energy-ray-curing resin was used.

EXAMPLE 1

Conditions

Resin material—urethane-acrylate-type resin (UV-curing resin)

Mold member—fluorocarbon resin tetrafluoroethylene (Teflon made by DuPont) mirror cutting by a diamond cutting tool using an ultraprecise lathe Physical Properties Hardness (ASTM D2240): D55

Modulus of elasticity (ASTM D747): 5000 kgf/cm$^2$

Coefficient of friction (ASTM D1894): 0.1–0.4

Coefficient of water absorption (dipping in water for 24 hours): 0%

Light resistance (ASTM E187): invariable, where ASTM stands for American Society for Testing Materials Lens diameter—32 mm Radius of curvature of glass member—55 mm Amount of supply of resin material—72 mg Thickness of central portion of resin layer—20 $\mu$m Amount of asphericity—60 $\mu$m Active-energy rays—ultraviolet rays having a central wavelength of 365 nm Amount of irradiation—6000 mJ Results Mirror finishing property of mold—surface roughness equal to or less than 0.5 $\mu$m Peeling between resin layer and mold member during curing—no peeling Amount of deformation of glass member after curing—equal to or less than 0.6 $\mu$m Force required for releasing—equal to or less than 60 kg Amount of deviation of surface shape of resin layer from mold shape—equal to or less than 1 $\mu$m.

In the above-described Example 1, the resin layer 32 was formed by only one-sequence forming-processing. The amount of asphericity (the difference in thickness between the thickest portion and the thinnest portion of the resin layer 32) at that time is 60 $\mu$m, and the thickness at a central portion of the lens of the resin layer is 20 $\mu$m. The results at that time indicate that the amount of deviation of the surface shape of the resin layer 32 from the mold shape is as small as 1 $\mu$m, the amount of deformation of the glass member 30 after curing is as small as 0.6 $\mu$m, and no peeling occurs between the resin layer 32 and the mold member 12 (the forming surface 12b) during curing. The releasing force producing damage of the glass member 30 and deformation of the resin layer 32 is estimated to be about 150 kg. The above-described value of 60 kg for the force required for releasing is much less than the critical value. Actually, no problem occurred in the releasing operation.

EXAMPLE 2

Conditions

Mold member—ultrahigh molecular polyethylene (HI-ZEX made by Mitsui Petrochemical Industries, Ltd.)

The method of processing is the same as in Example 1.

Physical Properties

Hardness (ASTM D2240): D67–D69

Modulus of elasticity (ASTM D747): 9000–10000 kgf/cm$^2$

Coefficient of friction (ASTM D1894): 0.11–0.07

Coefficient of water absorption (dipping in water for 24 hours): equal to or less than 0.01%

Light resistance (ASTM E187): Substantially invariable

Other conditions are the same as in Example 1.
Results
Force required for releasing—100 kg
Other results are the same as in Example 1.

In this Example 2, the releasing force is somewhat larger than in Example 1, but is sufficiently smaller than the critical value of 150 kg, and therefore is within the practically usable range.

EXAMPLE 3

Conditions

Mold member—polyacetal (DERLIN made by DuPont) The method of processing is the same as in Example 1.

Physical Properties

Hardness (ASTM D2240): R118

Modulus of elasticity (ASTM D747): 26000–29000 kgf/cm$^2$

Coefficient of friction (ASTM D1894): 0.18–0.11

Coefficient of water absorption (dipping in water for 24 hours): 0.2–0.25%

Light resistance (ASTM E187): Substantially invariable

Other conditions are the same as in Example 1.

Results

Releasing force—equal to or less than 130 kg

Other results are the same as in Example 1.

Also in this Example 3, the releasing force is larger than in Example 1, but is within the practically usable range.

EXAMPLE 4

In this example, the resin layer was formed using a two-sequence forming-processing.

Conditions (1) Conditions for the first forming processing The same as in Example 1.

(2) Conditions for the second forming processing

Mold member—KN plating

Thickness of central portion of resin layer—10 um

The shape of the forming surface is the same as in conditions (1).

Results

Peeling between resin layer and mold member during curing—no peeling

Amount of deformation of glass member after curing—equal to or less than 0.6 $\mu$m Force required for releasing (in the second forming-)—120 kg Amount of deviation of surface shape of resin layer from mold shape—equal to or less than 0.2 um.

In the above-described example, forming processing was performed by superposing a thin resin layer having the thickness of a central portion of 10 $\mu$m on a resin layer formed under the same conditions as in Example 1. In this example, as shown in the results Example 1, the surface shape of the resin layer in the first forming processing is within the amount of deviation of about 1 $\mu$m from the mold shape. If the second forming processing is performed in this state using a mold having the same shape as the mold shape used in the first forming processing, the resin layer formed in the second forming processing has a substantially uniform thickness of about 10 $\mu$m. Hence, a difference in the manner of contraction in respective portions of the resin layer becomes very small, and the amount of deviation of the formed resin layer from the mold shape is equal to or less than 0.2 $\mu$m, and is therefore extremely precise.

The amount of deviation from the mold shape tends to increase as the thickness of the resin layer increases. Hence, accuracy in the shape of the final resin layer increases as the thickness of the second resin layer is reduced from the thickness of the first resin layer, as in the present example. The same conclusion also holds for the amount of asphericity. That is, accuracy in the shape of the resin layer increases as the amount of asphericity of the second resin layer is reduced from the amount of asphericity of the first resin layer. In the present example, since the same mold shape as in the first forming processing is used in the second forming processing, the amount of asphericity is inevitably reduced in the second forming processing. As a result, the above-described highly precise resin layer was obtained.

As the thickness of the resin layer and the amount of asphericity are reduced, adherence of the resin layer to the mold member due to the contraction of the resin layer tends to be reduced, whereby the releasing force is reduced. Hence, even if a metal mold is used in the second forming processing, the releasing force does not become too large. As a result, the releasing force is 120 kg, and is therefore within the practically usable range. A mold made of the same material (high molecular material) or the entirely identical mold as in the first forming processing may, of course, be used. However, since a mold made of a high molecular material has durability inferior to that of a metal mold, it is preferred to use a metal mold if the use of the metal mold causes no problem.

EXAMPLE 5

In this example, two-sequence forming-processing was also performed.

Conditions (1) Conditions for the first forming-processing

Thickness of central portion of resin layer—20 $\mu$m

Amount of asphericity—90 $\mu$m

Other conditions are the same as in Example 1.

(2) Conditions for the second forming processing

Mold member—KN plating

Thickness of central portion of resin layer—10 $\mu$m

Amount of asphericity—equal to or less than 10 $\mu$m

Results

Peeling between resin layer and mold member in curing—no peeling

Amount of deformation of glass member after curing—equal to or less than 0.6 $\mu$m Force required for releasing (in the second forming-)—120 kg Amount of deviation of surface shape of resin layer from mold shape—equal to or less than 0.2 $\mu$m In this example, the amounts of asphericity in the first and second forming processing were determined, and the condition that the amount of asphericity in the second forming processing is smaller than in the first forming processing was intentionally provided. The amount of asphericity in the first forming processing is larger than in Example 4. However, since the thickness of the resin layer and the amount of asphericity in the second forming processing are small, the same accuracy in the shape as in Example 4 was obtained. Since the shape of the resin layer in the second forming processing is close to the shape in Example 4, the releasing force is 120 kg, which is the same as in Example 4.

In order to perform comparison with the above-described examples, an explanation will be provided of conventional examples, and examples having forming conditions different from those of the above-described examples.

COMPARATIVE EXAMPLE 1 (CONVENTIONAL EXAMPLE)

Conditions

Mold member—phosphor bronze (mirror finishing by cutting)

Other conditions are the same as in Example 1.

Results

Mirror finishing capability of mold—surface roughness of 0.5 μm

Peeling between resin layer and mold member during curing—no peeling

Amount of deformation of glass member after curing—1.2 μm

Force required for releasing—equal to or more than 150 kg (⅓ cracked during releasing. difficult to release)

Amount of deviation of surface shape of resin layer from mold shape—equal to or less than 0.6 μm In the above-described comparative example, forming processing was performed using a mold member made of phosphor bronze. Since the mold member is not deformed during curing of the resin material, the amount of deviation of the resin layer from the mold shape is as small as 0.6 μm compared with Example 1. However, since the glass member is deformed by being drawn by the resin layer, the amount of deformation of the glass member is as large as 1.2 μm, whereby distortion was produced in the glass member. The releasing force was as large as 150 kg, whereby cracks were produced in the glass member during releasing. Accordingly, compared with Example 1, the present comparative example is not inferior in accuracy, but presents a big problem in releasability.

COMPARATIVE EXAMPLE 2 (CONVENTIONAL EXAMPLE)

Conditions

Mold member—polycarbonate (Panlite made by Teijin Kasei Ltd)

Physical properties

Hardness (ASTM D2240): R110–R120

Modulus of elasticity (ASTM D747): 23000 kgf/cm$^2$

Coefficient of friction (ASTM D1894): 0.35

Coefficient of water absorption (dipping in water for 24 hours): 0.15–0.2%

Light resistance: substantially invariable

Results

Mirror finishing capability of mold—surface roughness equal to or less than 0.5 μm Peeling between resin layer and mold member during curing—no peeling Amount of deformation of glass member after curing—0.5 μm Force required for releasing—equal to or less than 150 kg (difficult to release)

Amount of deviation of surface shape of resin layer from mold shape—1 μm

In this comparative example, the mold member used in Example 1 was replaced by a mold member made of polycarbonate. In this example, although accuracy is substantially the same as in Example 1, the releasing force is large. Hence, the same problems as in Comparative example 1 are present.

COMPARATIVE EXAMPLE 3

Conditions (1) Conditions in the first forming processing Thickness of central portion of resin layer—10 μm Other conditions are the same as in Example 4.

(2) Conditions in the second forming processing Thickness of central portion of resin layer—30 μm Other conditions are the same as in Example 1.

Results

Peeling between resin layer and mold member during curing—no peeling

Amount of deformation of glass member after curing—equal to or less than 0.6 μm

Force required for releasing (in the second forming)—equal to or more than 150 kg (difficult to release)

Amount of deviation of surface shape of resin layer from mold shape—1.2 μm

This comparative example differs from Example 4 in that the thickness of the resin layer in the second forming processing is larger than the thickness of the resin layer in the first forming processing. If the thickness of the resin layer in the second forming processing is increased as in the present example, the amount of deviation of the surface shape of the resin layer from the mold shape becomes 1.2 μm which is greater than in Example 4. Furthermore, the releasing force is large, causing problems in releasability.

COMPARATIVE EXAMPLE 4

Conditions (1) Conditions in the first forming processing

Amount of asphericity—30 μm

Other conditions are the same as in Example 5.

(2) Conditions in the second forming processing

Amount of asphericity—90 μm

Other conditions are the same as in Example 5.

Results

Peeling between resin layer and mold member during curing—no peeling

Amount of deformation of glass member after curing—equal to or less than 0.6 μm

Force required for releasing (in the second forming)—equal to or more than 150 kg (difficult to release)

Amount of deviation of surface shape of resin layer from mold shape—1 μm

This comparative example differs from Example 5 in that the amount of asphericity of the resin layer in the second forming processing is larger than the amount of asphericity of the resin layer in the first forming processing. If the amount of asphericity of the resin layer in the second forming processing is increased as in the present example, the amount of deviation of the surface shape of the resin layer from the mold shape becomes 1 μm which is greater than in Example 5. Furthermore, the releasing force is large, causing problems in releasability.

ANOTHER EMBODIMENT

Figure 3:
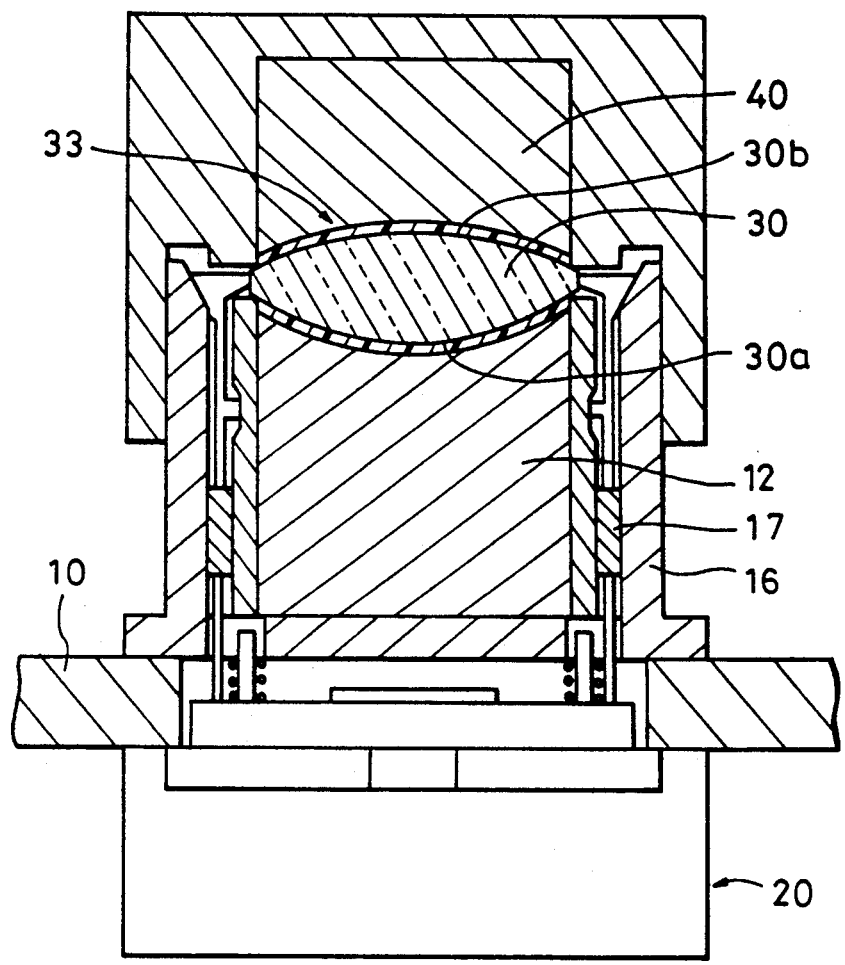
FIG. 3 is a diagram showing another embodiment of the present invention.
Figure 4:
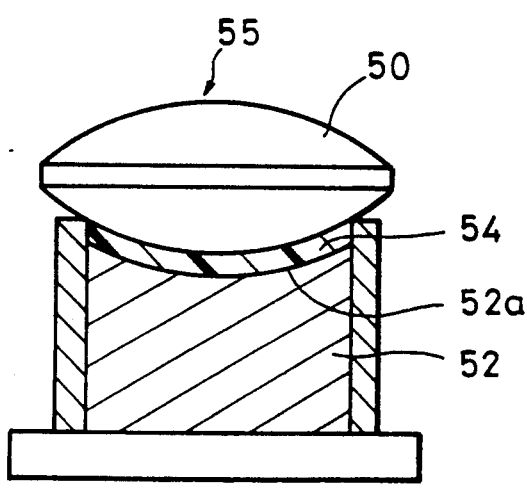
FIG. 4 is a diagram showing a conventional approach.

FIG. 3 is a diagram showing another embodiment of the present invention.

This embodiment differs from the first embodiment in that an upper mold member 40 for forming the resin layer is provided on an upper surface 30b of a glass member 30. Other configuration and operations are entirely the same as in the first embodiment. In the forming apparatus having such a configuration, the following forming conditions are, for example, provided.

Conditions

Resin material—urethane-acrylate-type resin (UV-curing resin)
Upper mold member—Teflon
Lower mold member—KN plating By this selection of the materials for the upper mold member 40 and the lower mold member 12, a replica lens 33 remains on the lower mold member 12 when the replica lens 33 is released, since the metal mold has a stronger adhering force to the resin material. This is preferable from the viewpoint of procedure in forming processing.

As explained above, in the first embodiment, since a high molecular weight material which has suitable physical properties is used as the material for the mold member, peeling will not occur between the resin layer 32 and the glass member 30, and between the resin layer 32 and the forming surface 12b of the mold member 12. Furthermore, since the releasing force does not become too large in releasing, releasing can be performed without causing damage to the glass member 30 and causing deformation of the resin layer 32.

In the second embodiment, by using a high molecular weight material which has physical properties shown in the first embodiment for the upper mold member 40, and a metal material for the lower mold member 12, the replica lens 33 always remains on the lower mold member 12 in releasing. This is preferable from the viewpoint of procedure in forming processing.

The present invention may also be applied to modifications of the above-described embodiments without departing from the spirit and scope of the invention.

For example, although, in the above-described embodiments, an explanation has been provided of a case wherein a UV-curing resin is used as the active-energy-ray-curing resin, the invention is not limited to such a resin, but an X-ray-curing resin or an infrared-ray-curing resin may, for example, be used.

Although, in the first embodiment, an explanation has been provided of a case of forming a concave lens, the present invention may also be applied to a case of forming a convex lens only by changing the shape of the forming surface.

Although an explanation has been provided of a case of forming the resin layer in one-sequence or two-sequence forming processing, the resin layer may be formed in forming processing in at least three sequences. In such a case, a resin layer having higher accuracy in the shape can be formed if the thickness of the constituent resin layer is sequentially reduced from the first layer. That is, the first resin layer has a greater difference between the thickness of respective portions in that layer than the respective portions of the resin layers formed in the other sequences of forming-processing. The first resin layer is formed by a mold member comprising a high molecular weight material having the physical values of a hardness greater than D50 and/or R70, a modulus of elasticity in the range of 5000–35000 kgf/cm$^2$, a coefficient of friction which is less than 0.2, a coefficient of water absorption which is less than 0.3% and a light resistance which is invariable or substantially invariable.

In the above-described explanation, since it is desirable to sequentially reduce the thickness of each constituent resin layer from the viewpoint of accuracy in the shape of the resin layer, the first constituent resin layer has the greatest thickness and the greatest amount of asphericity. The average thickness of the first resin layer obtained by a first sequence in a plurality of sequences of forming-processing is greater than the average thickness of the other resin layers formed in the plurality of sequences of forming-processing. The first resin layer is formed by employing a mold member comprising a high molecular weight material having the physical values of a hardness greater than D50 and/or R70, a modulus of elasticity in the range of 5000–35000 kgf/cm$^2$, a coefficient of friction which is less than 0.2, a coefficient of water absorption which is less than 0.3% and a light resistance which is invariable or substantially invariable. However, if the resin layer is formed in forming processing in at least three sequences, the second constituent resin layer may be the thickest, and the third constituent resin layer thinner than the second constituent resin layer may then be formed. Accordingly, the constituent resin layer having the greatest thickness and the greatest amount of asphericity is not limited to the first layer. However, the above-described explanation holds in that a mold member made of a high molecular weight material as shown in the embodiments must be used in forming the constituent resin layer having the greatest thickness and the greatest amount of asphericity.

Although an explanation has been provided of a case of forming a replica lens, the present invention may also be applied to other kinds of optical elements provided that a resin layer is formed on a surface of a glass material.

As explained above, according to the optical element, and the method and apparatus for forming the element of the present invention, by using a high molecular weight material for the mold member, the mold member is deformed in response to contraction of the resin material, whereby it is possible to prevent peeling between the resin layer and the glass member, and peeling between the resin layer and the mold member.

In addition, since the mold member is deformed so as to prevent peeling between the resin layer and the glass member, and peeling between the resin layer and the mold member, it is possible to select the physical properties of the material of the mold member so that the binding force between the resin material and the mold member does not become too large. Hence, it is possible to prevent, for example, damage of the optical element while it is being released.

While the present invention has been described with respect to what is presently considered to be the preferred embodiments, it is to be understood that the invention is not limited to the disclosed embodiments. The present invention is intended to cover the various modifications and equivalent arrangements included within the spirit and scope of the appended claims.

What is claimed is:

1. An optical-element forming method for forming an optical element formed from a glass material and a resin material made as one body by forming a resin layer having a predetermined surface shape of said optical element on a surface of a glass member by one sequence forming-processing, said method comprising the steps of:

providing a mold member for transferring said predetermined surface shape of said optical element onto said resin layer;

transferring said predetermined surface shape of said optical element onto said resin layer by employing said mold member comprising a high molecular weight material having the physical values of:
a hardness greater than D50;
a modulus of elasticity in the range of 5000–35000 kgf/cm$^2$;
a coefficient of friction which is less than 0.2;
a coefficient of water absorption which is less than 0.3%; and
a light resistance which is substantially invariable.

2. A method according to claim 1, wherein said resin material comprises an active-energy-ray-curing resin.

3. A method according to claim 2, wherein an aspherical lens surface is formed by said resin material.

4. An optical-element forming method for forming an optical element providing a resin layer having a final desired predetermined surface shape of said optical element obtained by combining a plurality of resin layers each having a resin layer thickness, and including a first resin layer, said resin layers being made integral with a glass member by sequentially laminating the plurality of said resin layers, each of said resin layers having a predetermined surface shape of said optical element on a surface of the glass member, by a plurality of sequences of forming-processing, said method comprising the steps of:

providing a mold member for transferring said predetermined surface shape of said optical element onto said resin layer in at least one of said plurality of sequences of forming-processing;

transferring said predetermined surface shape of said optical element onto said resin layer by employing said mold member comprising a high molecular weight material having the physical values of:
a hardness greater than D50;
a modulus of elasticity in the range of 5000–35000 kgf/cm$^2$;
a coefficient of friction which is less than 0.2;
a coefficient of water absorption which is less than 0.3%; and
a light resistance which is substantially invariable.

5. A method according to claim 4, wherein said first resin layer has a greater difference between the thicknesses of respective portions of said layer than to the respective portions of all other said resin layers formed by said plurality of sequences of forming-processing, and wherein said first resin layer is formed by employing a mold member comprising the high molecular weight material having said physical values.

6. A method according to claim 4, wherein an average thickness of said first resin layer is greater than the average thickness of said resin layers formed by said plurality of sequences of forming-processing, said first resin layer being formed in a first forming-processing sequence among said plurality of sequences of forming-processing, and wherein said first resin layer is formed by employing a mold member comprising the high molecular weight material having said physical values.

7. A method according to any of claims 4, 5 or 6, wherein the resin material forming said resin layer comprises an active-energy-ray-curing resin.

8. A method according to claim 1, wherein said hardness is no greater than R70.

9. A method according to claim 4, wherein said hardness is no greater than R70.

* * * * *

UNITED STATES PATENT AND TRADEMARK OFFICE
CERTIFICATE OF CORRECTION

PATENT NO. : 5,286,421
DATED : February 15, 1994
INVENTOR(S) : TAKASHI ARAI

It is certified that error appears in the above-identified patent and that said Letters Patent is hereby corrected as shown below:

COLUMN 10

Line 4, "(Teflon" should read --(TEFLON--.
Line 67, "Substantially" should read --substantially--.

COLUMN 11

Line 12, "(DERLIN" should read --(DELRIN--.
Line 51, "0.2 um." should read --0.2 µm.--.

COLUMN 14

Line 4, "processing Thick-" should read
--processing ¶ Thick- --.
Line 5, "10 µ Other" should read --10 µm ¶ Other--.

COLUMN 16

Line 57, "optical-element forming" should read
--optical element-forming--.

COLUMN 17

Line 15, "optical-element forming" should read
--optical element-forming--.

UNITED STATES PATENT AND TRADEMARK OFFICE
CERTIFICATE OF CORRECTION

PATENT NO. : 5,286,421
DATED : February 15, 1994
INVENTOR(S) : TAKASHI ARAI

It is certified that error appears in the above-identified patent and that said Letters Patent is hereby corrected as shown below:

COLUMN 18

Line 4, "of elasticity of elasticity" should read --of elasticity--.

Signed and Sealed this

Thirteenth Day of December, 1994

Attest:

BRUCE LEHMAN

Attesting Officer

Commissioner of Patents and Trademarks